March 2, 1965

A. W. MILLWARD 3,171,170

SHELL CORE CURING

Filed May 17, 1962

INVENTOR.
ARTHUR W. MILLWARD
BY Woodling, Krost,
Granger and Rust
ATTORNEYS

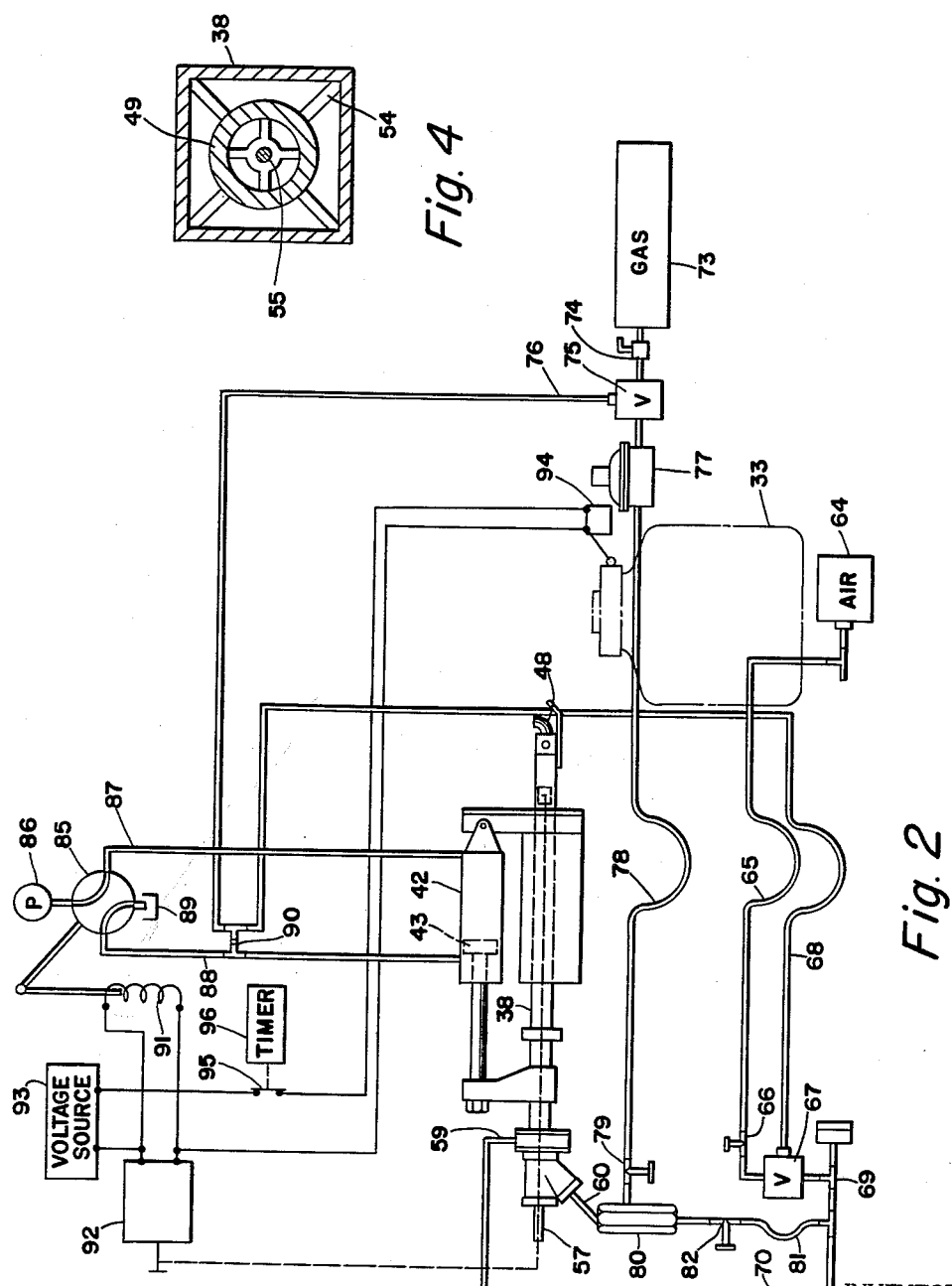

United States Patent Office 3,171,170
Patented Mar. 2, 1965

3,171,170
SHELL CORE CURING
Arthur W. Millward, Cleveland, Ohio, assignor to The National Acme Company, a corporation of Ohio
Filed May 17, 1962, Ser. No. 195,457
9 Claims. (Cl. 22—10)

The invention relates in general to the heat curing of shell cores for metal casting and more particularly to apparatus to cure the inside of shell cores with a blast of hot air.

The invention is used in a shell core machine which has a frame and first and second core box halves mounted thereon for relative movement toward and from each other wherein investment means is used to invest heat curable material into the closed core box through an opening, means is provided to relatively separate the investment means and the closed core box with a thin layer of heat curable material partially cured within the core box. A heater is carried on the frame and has a nozzle thereon, valve means supplies air through the heater to the nozzle, heating means is in the heater to heat the air, and means is connected to move the nozzle from a first position removed from the core box opening to a second position adjacent and directed toward the downwardly facing core box opening to aid in curing the layer of heat curable material within the core box.

Shell cores, generally comprising sand plus a heat curable material, have recently come into increasing use in the metal casting industry. Instead of using a solid sand core to form a hollow cast metal part, a shell core may be used which, in turn, is hollow. This shell core is made to have the requisite strength to resist the pressure of the molten casting metal by being formed of a thermosetting material mixed with sand, for example as a filler. The shell core is built up to about ¼ to ½ inch in thickness by being heated and partially cured in a core box and then excess heat curable material is dumped out of the partially cured shell leaving a shell core. It has been found that large size shell cores are difficult to cure because of the long curing time within the core box. If excessive curing time is used, this tends to overbake the outside of the shell, but a so-called normal curing time only partly cures the inside of the shell, resulting in a soft inner surface plus a collection of surplus sand. This is a problem with large cavities in shell cores and it is also a problem with shell cores of complex internal surface wherein it is difficult to obtain uniformity of heating of the shell core from the outside only. Still further, during the curing of the shell core, some parts of the sand and heat curable mixture may be partly fused and then break away to fall back into the sand hopper. This is quite objectionable because these large chunks of partly cured material are thus in a reality foreign material for the next cycle of the shell core machine.

Accordingly, an object of the invention is to provide a shell core machine with apparatus for heat curing the internal surface of the shell core.

Another object of the invention is to provide a shell core curing apparatus by a blast of hot air within the internal cavity of the shell core.

Another object of the invention is to provide an upward blast of heated air directed toward a downwardly facing core box opening to blast any surplus heat curable material out of the cavity of the shell core and also to aid in curing the inner surface of the shell core.

Another object of the invention is to provide a curing apparatus which moves horizontally under a core box having a downwardly facing opening so that the partially cured shell core within the core box need not be further disturbed after investment of the partially cured shell core, and the blast of heated air is directed upwardly into the core box opening to cure the internal surface of the shell core.

Other objects and a fuller understanding of the invention may be had by referring to the following description and claims, taken in conjunction with the accompanying drawings, in which:

FIGURE 2 is a schematic diagram of the electrical and pneumatic connections for the shell core machine;

FIGURE 4 is a sectional view on line 4—4 of FIGURE 3.

Figures 1, 3:
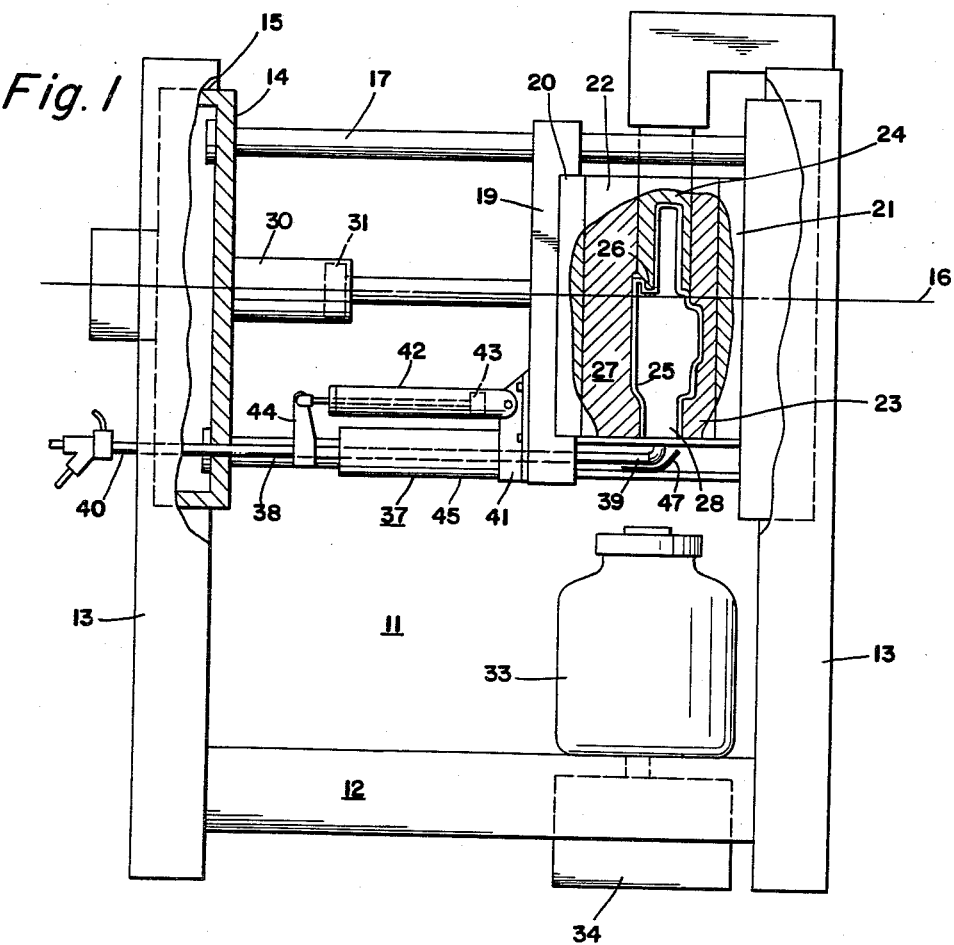
FIGURE 1 is a side elevational view partially in section of a shell core machine embodying the invention.
FIGURE 3 is an enlarged cross-section view of the heater tube.

The figures of the drawing show a shell core machine 11 which is illustrative of one embodiment of the invention. The machine 11 includes generally a base 12 having fixed uprights 13 which journal a revolving carriage 14 on trunnions 15 within the upright 13. The carriage 14 revolves about an axis 16. The revolving carriage includes tie rods 17, in this case four in number, joining the two ends of the carriage 14. A movable head 19 is carried for longitudinal sliding movements on the tie rods 17 and carries a movable heater plate 20 for cooperation with a second heater plate 21 carried at the right end of the carriage 14. A movable core box half 22 is carried on the movable heater plate 20 and cooperates with a second core box half 23. Optionally, a loose piece 24 may be provided on the core box where complex shell cores 25 are to be formed including a reentrant tongue 26. The core box halves 22 and 23 and the loose piece 24 from a complete core box 27 which, when closed, has a core box opening 28.

A cylinder 30 and piston 31 are connected to move the movable core box half 22 along the tie rod 17 and relative to the second box half 23. Thus, the core box 27 may be opened and closed.

A sand hopper 33 is provided to carry a supply of heat curable material with a filler such as sand. A motive means 34 is provided to move the sand hopper 33 upwardly into engagement with the core box opening 28 at which position clamps, not shown, may be actuated to clamp the sand hopper 33 to the core box 27. This is with the core box 27 in the closed position.

The shell core machine 11 is provided with an internal hot air cure attachment 37 which includes generally a heater tube 38. This heater tube 38 has first and second ends 39 and 40, respectively, and is mounted generally horizontally on the machine 11. A bracket 41 is fixed to the movable head 19 so that the entire internal cure attachment 37 moves with this head 19. A cylinder 42 is attached to the bracket 41 and carries a piston 43 connected by a link 44 to the heater tube 38. Thus, movement of the piston 43 reciprocates the heater tube 38 in a horizontal path relative to the movable head 19 as guided by guide plates 45.

FIGURES 3 and 4 show an enlarged partial view of the heater tube 38. The first end 39 of this heater tube 38 carries a 90 degree pipe elbow 48 which is directed upwardly and acts as a nozzle or discharge opening for heated air. A screen 47 is carried on the underside of the nozzle 48. A gas tube 49 is mounted coaxially within the heater tube 38 and has a first end 50 near the first end 39 of the heater tube 38. The gas tube 49 also has a second end 51 adjacent the second end 40 of the heater tube 38. A gas blast tip 52 is fixed to the first end 50 of the gas tube 49 at which a gas flame 53 is developed. The gas tube 49 may be held coaxially within the heater tube 38 by spiders 54. An electrode 55 extends longitudinally within the gas tube 49 and has a bent tip 56 extending close to the side wall of the gas blast tip 52.

This may be like a spark plug electrode with such electrode carried by a spark plug type insulated fitting 57 at the second end 40 of the heater tube 38. The electrode 55 is held by insulating spiders 58 in coaxial alignment with the gas tube 49. The heater tube 38 at the second end thereof has an inlet 59 for secondary air and the second end 51 of the gas tube 49 has an inlet 60 for a gas and air mixture.

FIGURE 2 illustrates schematically the supply of gas and air to the internal cure attachment 37. An air manifold 64 supplies high pressure air from any suitable source to the machine 11. This high pressure air is supplied through a flexible conduit 65 to a needle valve 66 fixed on the base of the base 12 of the machine 11. This high pressure air then passes through a pilot valve 67 which is normally closed and may be actuated to an open position by fluid pressure on a control line 68. Air is then supplied to a line 69 and through a flexible conduit 70 to the second air inlet 59 of the heater tube 38. Gas is supplied from a low pressure gas source 73 through a valve 74 to a pilot valve 75. This pilot valve is normally closed and may be actuated to an open position by air pressure on a control line 76. The gas flows through a gas pressure regulator 77 and through a flexible conduit 78 to a needle valve 79 and then to a gas air mixer 80. This mixer is carried on the second end 40 of the heater tube 38. Air is supplied through a flexible conduit 81 from the air line 69 through a needle valve 82 to the gas-air mixer 80. Here the air is mixed with the gas in the proper proportion for burning. This gas-air mixture is supplied to the gas-air inlet 60 at the second end 51 of the gas tube 49.

A valve such as a four-way valve 85 is connected to a fluid pressure source such as an air pressure source 86. This four-way valve 85 may supply fluid pressure to a conduit 87 or to a conduit 88. The conduit 87 leads to the forward end of the cylinder 42 to hold the heater tube 38 in the rearward position. At this time conduit 88 is connected through the valve 85 to an outlet or sump 89. The conduit 88 is connected to the rearward end of the cylinder 42 and thus if fluid pressure is supplied to the conduit 88, the piston 43 and heater tube 38 will move forwardly.

A solenoid 91 is connected to actuate the valve 85 which may be spring biased to the position shown in FIGURE 2. A transformer 92 may supply high voltage for operation of the spark plug electrode 55. A voltage source 93 is provided for energization of the solenoid 91 and transformer 92, as effected by a limit switch 94. This limit switch is mounted for actuation by the sand hopper 33 when in the down position removed from the core box opening 28. A timer 96 controls a switch 95 also connected to control energization of the transformer 92 and solenoid 91.

*Operation*

The shell core machine 11 may be operated in the usual manner. The piston 31 may be actuated to the right to close the core box 27. Next, the motive means 34 is actuated to move the sand hopper 33 into engagement with the core box opening 28 at which position clamps, not shown, clamp the sand hopper 33 to the core box 27. The revolving carriage 14 then revolves 180 degrees on the axis 16 to invest sand and heat curable material from the hopper 33 into the cavity of the core box 27. This may be aided by air pressure through the sand hopper if desired. After a suitable time for partial curing of a shell core 25 within the core box 27, the revolving carriage 14 is again rotated on the axis 16. It may be rocked slightly from side to side to empty all the sand and heat curable material not used back into the hopper 33. There is thus a layer of partially cured sand and heat curable material within the core box 27 which eventually results in the shell core 25. The sand hopper 33 is then retracted to the position shown in FIGURE 1. At this point the internal cure attachment 37 may be used. With the hopper 33 retracted, the limit switch 94 is actuated. This energizes the transformer 92 and the solenoid 91. The four-way valve 85 is thus actuated to supply fluid pressure to the conduit 88. This moves the piston 43 forwardly and moves the heater tube 38 forwardly. The nozzle 48 is thus moved from a first position removed from the core box opening 28 to a second position generally directly below the core box opening 28 as shown in FIGURE 1. Fluid pressure in the conduit 88 not only moves the piston 43 but supplies fluid pressure through the T fitting 90 to the control lines 68 and 76. This opens the pilot valves 67 and 75, respectively, to supply the gas-air mixture to the gas tube 49 and to supply secondary air to the heater tube 38. The aforementioned energization of the transformer 92 supplies a spark at the electrode tip 56 to ignite the gas-air mixture and produce the gas flame 53. This heats the secondary air supplied through the heater tube 38 and this heated air is supplied at a fairly high velocity out the nozzle 48. It is directed upwardly into the interior of the shell core 25. This has the beneficial effect of blasting loose any partially cured fragments which, thus, are forced out of the core box opening 28 and are caught on the screen 47. This screen prevents any large fragments of partially cured material falling back into the sand hopper 33 and, thus, keeps it clear of contamination. If chunks or fragments of partially cured material were permitted to drop back into the sand hopper 33, this could preclude proper operation thereof because their subsequent investment into the core box 27 on subsequent cycles could result in an uneven layer built up for the shell core and also possibly result in imperfectly bonded shell cores which would fracture when used for the later metal casting purposes of the shell core.

The blast of hot air may be adjusted to be anywhere from 300 to 1,000° F. and this blast of hot air rapidly aids the curing of the shell core 25 from the inside out. It has been observed that such internal curing reduces the total curing time by up to 25%, thus enabling faster cycling times and greater productivity per machine and per unit of time. Additionally, the fact that the cores 25 are cured both from the inside and from the outside results in a stronger core without any softness or gumminess on the inside. This stronger core means that in many cases, a thinner core may be used for the same strength and thus this results in a saving of sand and more importantly, a saving in heat curable material.

The internal cure may be terminated by the timer 96 timing out and opening the switch 95. Thus, with the shell core 25 cured, the core box 27 may be opened and this core removed. The machine 11 is then ready for another cycle of operation.

The blast of air directed upwardly into the downward facing core box opening 28 not only aids curing of the shell core and blasting loose any partially cured chunks, but also makes certain that such chunks or particles are removed from the shell core and caught on the screen 47. This is an advantage in retaining the shell core in its inverted position, after formation of the partially cured shell 25 until completion of curing by the hot air blast from the nozzle 48.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a shell core machine having a frame and first and second heated core box halves mounted thereon for relative movement toward and from each other,
said core box halves having a sand opening, the provision of, heat curable material investment means, means to invest heat curable material into said closed core box through said opening from said investment means, means to relatively withdraw said investment means and said closed core box with a thin layer of heat curable material partially cured within said core box, a heater tube carried on said frame and having first and second ends, valve means to supply air through said tube to said first end of said tube, heating means to heat said air, an upwardly directed nozzle on said first end of said heater tube, power means connected to move said heater tube from a first position removed from said core box opening to a second position whereat said discharge opening is generally beneath and directed upwardly toward the downwardly facing core box opening, and means controlled in accordance with movement of said heater tube to open said valve means and to render said heating means operative to supply heated air out said nozzle of said heater tube toward said core box opening to aid in curing the layer of heat curable material within said core box and to aid in blowing any loose material downwardly out of said core box opening.

2. In a shell core machine having a frame and first and second core box halves mounted for relative movement toward and from each other, said core box halves having a sand opening and means for heating, the provision of, sand and heat curable material investment means, means to invest sand and heat curable material into said closed core box through said opening from said investment means, means to relatively withdraw said investment means and said closed core box with a thin layer of sand and heat curable material partially cured within said core box, a heater tube carried on said frame and having first and second ends, valve means to supply gas and air mixture to said first end of said tube, an upwardly directed discharge opening on said first end of said heater tube, ignition means to ignite said gas and air mixture, power means connected to move said heater tube from a first position removed from said core box opening to a second position whereat said discharge opening is generally beneath and directed upwardly toward the downwardly facing core box opening to aid in curing the layer of sand and curable material within said core box, and a screen carried beneath said discharge opening to screen any lumps of sand and heat curable material falling out of said core box.

3. In a shell core machine having a frame and first and second core box halves mounted for relative movement toward and from each other, said core box halves having a sand opening and means for heating, the provision of, sand and heat curable material investment means, means to invest sand and heat curable material into said closed core box through said opening from said investment means, means to relatively withdraw said investment means and said closed core box with a thin layer of sand and heat curable material partially cured within said core box, a heater tube carried on said frame and having first and second ends, valve means to supply gas and air mixture to said first end of said tube, an upwardly directed discharge opening on said first end of said heater tube, ignition means to ignite said gas and air mixture, power means connected to move said heater tube from a first position removed from said core box opening to a second position whereat said discharge opening is generally beneath and directed upwardly toward the downwardly facing core box opening, and means controlled in accordance with movement of said heater tube to open said valve means and to render said ignition means operative to produce a gas flame and supply heated air out said discharge opening of said heater tube toward said core box opening to aid in curing the layer of sand and curable material within said core box.

4. In a shell core machine having a frame and first and second core box halves mounted for relative movement toward and from each other, said core box halves having a sand opening, the provision of, sand and heat curable material investment means, means to invest sand into said closed core box through said opening from said investment means, means to heat said core box halves to partially cure a shell core in said closed core box, means to withdraw said investment means from said closed core box opening with a thin layer of sand and heat curable material partially cured within said core box, a heater tube carried on said frame and having first and second ends, valve means to supply gas and air to said second end of said tube, ignition means in said heater tube near said first end to ignite said gas and air mixture, an upwardly directed discharge opening on said first end of said heater tube, power means connected to move said heater tube from a first position removed from said core box opening to a second position whereat said upwardly directed discharge opening is generally beneath said core box opening with said core box opening facing downwardly, and means controlled in accordance with movement of said heater tube to open said valve means and to energize said ignition means to produce a gas flame and supply heated air out said discharge opening of said heater tube toward said core box opening to aid in curing the layer of sand and curable material within said core box.

5. In a shell core machine having a frame and first and second core box halves mounted for relative movement toward and from each other, the provision of, means to relatively close said core box halves, said core box halves having a sand opening capable of being positioned at the bottom thereof, sand and heat curable material investment means, means to invest sand into said closed core box through said opening from said investment means, means to heat said core box halves to partially cure a shell core in said closed core box, means to withdraw said investment means from said closed core box opening with a thin layer of sand and heat curable material partially cured within said core box, a heater tube mounted generally horizontally on said frame and having first and second ends, valve means to supply gas and air to said second end of said tube, ignition means in said heater tube near said first end to ignite said gas and air mixture, an upwardly directed discharge opening on said first end of said heater tube, power means connected to move said heater tube generally horizontally from a first position removed from said core box opening to a second position whereat said upwardly directed discharge opening is generally beneath said core box opening with said core box opening facing downwardly, and means controlled in accordance with movement of said heater tube to open said valve means and to energize said ignition means to produce a gas flame and supply heated air out said discharge opening of said heater tube toward said core box opening to aid in curing the layer of sand and curable material within said core box.

6. In a shell core machine having a frame and first and second core box halves mounted for relative movement toward and from each other, the provision of, means to relatively close said core box halves, said core box halves having a sand opening capable of being positioned at the bottom thereof, sand and heat curable material investment means, means to invest sand into said closed core box through said opening from said investment means, means to heat said core box halves to partially cure a shell core in said closed core box, means to withdraw said investment means from said closed core box with a thin layer of sand and heat curable material partially cured within said core box, a heater tube mounted generally horizontally on said frame and having first and second ends, a gas tube within said heater tube, first valve means to supply gas to said second end of said gas tube, second valve means to supply air to said second end of said gas tube to mix with said gas therein and to supply secondary air to the second end of said heater tube, ignition means on a first end of said gas tube near said first end of said heater tube to ignite said gas and air mixture, an upwardly directed discharge opening on said first end of said heater tube, power means connected to move said heater tube generally horizontally from a first position removed from said core box opening to a second position whereat said upwardly directed discharge opening is generally beneath said core box opening, and means controlled in accordance with movement of said heater tube to open said first and second valve means and to energize said ignition means to supply a gas flame at said first end of said gas tube with secondary air delivered through said heater tube supplying hot air out said discharge opening of said heater tube toward said core box opening to aid in curing the layer of sand and curable material within said core box.

7. In a shell core machine having a frame and first and second core box halves mounted for relative movement toward and from each other, the provision of, means to relatively close said core box halves, said core box halves having a sand opening capable of being positioned at the bottom thereof, means to heat said core box halves to partially cure a shell core in said closed core box, means to invest sand and heat curable material into said closed core box through said opening to obtain a thin layer of sand and heat curable material partially cured within said core box, a heater tube mounted generally horizontally on said frame and having first and second ends, a gas tube within said heater tube, first valve means to supply gas to said second end of said gas tube, second valve means to supply air to said second end of said gas tube to mix with said gas therein and to supply secondary air to the second end of said heater tube, ignition means on a first end of said gas tube near said first end of said heater tube to ignite said gas and air mixture, an upwardly directed discharge opening on said first end of said heater tube, power means connected to move said heater tube generally horizontally from a first position removed from said core box opening to a second position whereat said upwardly directed discharge opening is generally beneath said core box opening, and means controlled in accordance with movement of said heater tube to open said first and second valve means and to energize said ignition means to supply a gas flame at said first end of said gas tube with secondary air delivered through said heater tube supplying hot air out said discharge opening of said heater tube toward said core box opening to aid in curing the layer of sand and curable material within said core box.

8. In a shell core machine having a frame and first and second core box halves mounted for relative reciprocation toward and from each other, the provision of, means to relatively close said core box halves, said core box halves having a sand opening at the bottom thereof, means to heat said core box halves to partially cure a shell core in said closed core box, means to invest sand and heat curable material into said closed core box through said opening to obtain a thin layer of sand and heat curable material partially cured within said core box, a heater tube mounted generally horizontally on said frame and having first and second ends, a gas tube within said heater tube, an ignition tip on a first end of said gas tube near said first end of said heater tube, an electrode insulatedly mounted within said gas tube and extending to said ignition tip, high voltage transformer means to supply high voltage to said electrode relative to said gas tube, first valve means to supply gas to said second end of said gas tube, second valve means to supply air to said second end of said gas tube to mix with said gas therein and to supply secondary air to the second end of said heater tube, an upwardly directed discharge opening on said first end of said heater tube, power means connected to move said heater tube generally horizontally from a first position removed from said core box opening to a second position whereat said upwardly directed discharge opening is generally beneath said core box opening, and means controlled in accordance with movement of said heater tube to open said first and second valve means and to energize said transformer means to supply a gas flame at said first end of said gas tube with secondary air delivered through said heater tube supplying hot air out said discharge opening of said heater tube toward said core box opening to aid in curing the layer of sand and curable material within said core box.

9. In a shell core machine having a frame and first and second core box halves mounted for relative reciprocation toward and from each other, the provision of, ram means to relatively close said core box halves, said core box halves having a sand opening at the bottom thereof, means to bring a sand hopper upwardly into engagement with said core box halves at said opening, means to invert said hopper and said core box halves to invest sand into said closed core box, said sand including a heat curable material mixed therewith, means to heat said core box halves to partially cure a shell core in said closed core box, means to reinvest said hopper and said closed core box to return unused sand to said hopper and retaining a thin layer of sand and heat curable material partially cured within said core box, means to lower said sand hopper away from said core box opening, a heater tube mounted generally horizontally on said frame and having first and second ends, a gas tube within said heater tube, an ignition tip on a first end of said gas tube near said first end of said heater tube, an electrode insulatedly mounted within said gas tube and extending to said ignition tip, high voltage transformer means to supply high voltage to said electrode relative to said gas tube, first valve means to supply gas to said second end of said gas tube, second valve means to supply air to said second end of said gas tube to mix with said gas therein and to supply secondary air to the second end of said heater tube, an upwardly directed discharge opening on said first end of said heater tube, an air cylinder connected to move said heater tube generally horizontally from a first position removed from said core box opening to a second position whereat said upwardly directed discharge opening of said heater tube is generally beneath said core box opening, and means controlled in accordance with movement of said air cylinder to open said first and second valve means and to energize said transformer means to supply a gas flame at said first end of said gas tube with secondary air delivered through said heater tube supplying hot air out said discharge opening of said heater tube toward said core box opening to aid in curing layer of sand and curable material within said core box.

References Cited by the Examiner
UNITED STATES PATENTS

| | | | |
|---|---|---|---|
| 2,427,178 | 9/47 | Aubert | 266—5 |
| 2,852,818 | 9/58 | Shallenberger et al. | 22—10 |
| 2,935,312 | 5/60 | Kilpatrick et al. | 266—23 |
| 2,976,589 | 3/61 | Hackett | 22—193 |

MICHAEL V. BRINDISI, *Primary Examiner.*

MARCUS U. LYONS, *Examiner.*